July 15, 1930.  P. S. DONCHIAN  1,770,879
RUG FASTENER
Filed Oct. 21, 1927
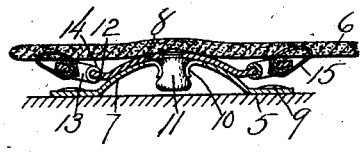
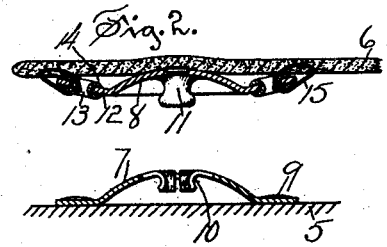
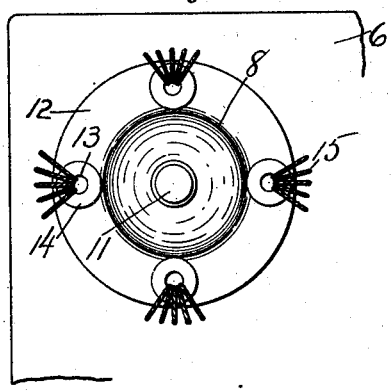
INVENTOR
Paul S. Donchian.
by
Arthur B. Jenkins.
ATTORNEY Patented July 15, 1930

1,770,879

UNITED STATES PATENT OFFICE

PAUL S. DONCHIAN, OF HARTFORD, CONNECTICUT, ASSIGNOR TO THE SAMUEL DONCHIAN RUG COMPANY, OF HARTFORD, CONNECTICUT, A CORPORATION OF CONNECTICUT

RUG FASTENER

Application filed October 21, 1927. Serial No. 227,810.

My invention relates particularly to that class of devices that are employed for removably securing a rug to a floor or similar surface, and an object of my invention, among others, is the production of a device of this class having means for securing it to a rug in a manner to provide for a minimum wear of the threads for securing the fastener member in place.

One form of a device embodying my invention and in the construction and use of which, the objects herein set out, as well as others, may be obtained is illustrated in the accompanying drawings in which—

Figure 1 is a view in central section through a rug fastener embodying my invention and illustrating the fastener as securing the rug in position on a floor or similar surface.

Figure 2 is a view similar to Figure 1, but showing the rug lifted and one fastener disengaged from the other fastener member.

Figure 3 is a view of the underside of the rug showing one of the fastener members secured in place thereto.

It has been common practice for a good many years, owing to the highly polished surfaces of floors in use at the present time, to provide means for preventing sliding movement of rugs on such floors, and at the same time, owing to the character of such a floor covering, it is provided that such fastening means shall enable the rug to be readily removed from the floor. To effect this purpose fasteners embodying the well-known stud and socket principles have been employed, and in such use one of the members, as the stud member, has been secured to the rug as by means of stitches, while the other fastener member, as the socket member, is secured to the floor as by means of brads or tacks.

These fastener members are commonly composed of metal and holes have been formed through them through which holes the stitches are passed. These holes however present more or less sharp edges with the consequence that the stitches quickly wear off and the fastener member becomes partially or wholly loosened from the rug. Various means have been devised for overcoming this objectionable result, such means embodying in many cases prongs integrally formed with the fastener member and projecting through the rug with their ends overturned to secure the fastener member in place. This manner of securing the fastener however has proved objectionable from the fact that the prongs become an element of wear to the rug. Other means embodying the use of stitches have been devised for securing the fastener member in place, but such means have always possessed that feature of sharp edges through openings through which the stitches extend, thus constituting an objectionable element of wear.

It is the purpose of my present invention to provide means whereby thread may be employed to secure a fastener member in place, thus enabling the ordinary housewife to secure the fastener member by means readily at hand, my invention particularly embodying means whereby the wear upon the threads by the fastener member shall be reduced to a minimum. Such a device is shown in the accompanying drawings in which the numeral 5 indicates a floor, 6 a rug, 7 the socket member of a stud and socket fastener, and 8 the stud member of said fastener. The socket member 7 is arranged to be secured to the floor in a usual and common manner as by means of brads or nails 9, said member having a yielding socket 10 to receive a stud 11 projecting from the fastener member 8 in a manner common to devices of this class.

In carrying my invention into effect, holes are formed at proper intervals in a lip 12 on the stud member 8 of the fastener, these holes occupying the positions heretofore occupied by holes for receiving the stitches. In my improved fastener, however, I preferably make these holes larger than in fasteners heretofore and insert an eyelet 13 in each of said holes.

These eyelets may be formed from any suitable material, either composition or metal, but preferably the latter. These eyelets are provided with overturned lips 14, one of which may be originally formed on the eyelet and the other being spun or turned over so that said lips lie on opposite sides of the fastener around the hole provided for the eyelet. These lips 14 are of such thickness, and the eyelets are so located with respect to the edge of the fastener, that stitches 16 used to secure the fastener member in place are spaced from the outer end of the lip or flange 12 at the margin of the fastener.

It will thus be seen that the stitches are passed through the eyelets and through the material of the rug, the lips 14 spacing the stitches from the edge of the flange 12 so that no wear can take place at this point and the eyelets are curved in cross section so that no sharp edges are presented and undue wear will not take place at this point. As a further precaution against possible wear on the anchoring threads, the lip 12 is angularly arranged with respect to the remainder of the stud body 8 so that the lip will form an acute angle with the rug to which it is secured. All pull upon the threads 15, therefore, will be delivered to the stud body in the plane of the lip 12 and through the portions of the threads bearing upon the curved wall of the bore of each eyelet.

The use of rugs upon polished floors are more or less dangerous, unless they are securely held, owing to the liability of a fall being caused by slipping of the rug. It, therefore, becomes of importance to be assured that the rug will be secured in place and will not become loosened by reason of the wearing off of the stitches or otherwise. This danger is increased from the fact that a person usually treads upon rugs with assurance that they are secure, and with this assurance should the rug be loosened no precautions are taken to avoid a fall.

It, therefore, becomes of vast importance to prevent as much as possible any liability of a rug becoming loose, and especially by the wearing off of the stitches holding the fastener and such result is obtained by the fastener illustrated and described herein.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

A fastener comprising a socket member consisting of a centrally apertured, concavo-convex portion and a marginal securing flange extending truly radially of the axis of the member, and a stud member consisting of a concavo-convex body portion of less depth than the similarly shaped portion of the socket member, said body portion having a marginal flange bent backwardly away from its concaved side and formed with holes protected by eyelets, and a stud projecting axially from the concaved side of the body portion to be received in the aperture of the socket member, whereby when said members are connected the backwardly bent flange with its eyelets will be spaced from and diverge with respect to the radial flange of said socket member.

PAUL S. DONCHIAN.